Nov. 27, 1951 J. H. SCAFF ET AL 2,576,267
PREPARATION OF GERMANIUM RECTIFIER MATERIAL
Filed Oct. 27, 1948 2 SHEETS—SHEET 1

INVENTORS: J. H. SCAFF
H. C. THEUERER
BY
A. J. Guenther
ATTORNEY

INVENTORS: J. H. SCAFF
H. C. THEUERER
BY [signature]
ATTORNEY

Patented Nov. 27, 1951 2,576,267

UNITED STATES PATENT OFFICE 2,576,267

PREPARATION OF GERMANIUM RECTIFIER MATERIAL

Jack H. Scaff, Summit, N. J., and Henry C. Theuerer, New York, N. Y., assignors to Bell Telephone Laboratories, Incorporated, New York, N. Y., a corporation of New York Application October 27, 1948, Serial No. 56,742

4 Claims. (Cl. 29—25.3)

Figure 1:
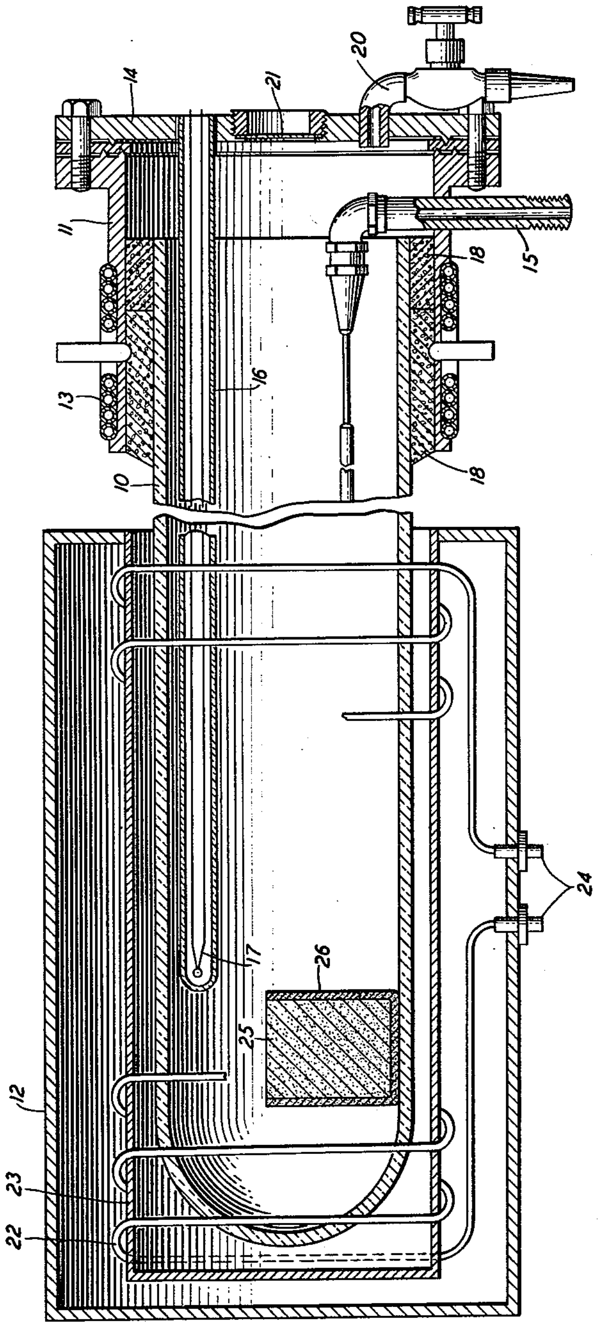

This invention relates to electrically conductive devices of germanium containing traces of significant impurities and more particularly to improvements in the preparation of such germanium material.

The term "significant impurities" as used in this application refers to those impurities which appear to have an effect upon the electrical characteristics of germanium, such as resistivity, photosensitivity, etc. as contrasted to other impurities which apparently do not affect these characteristics. The term "impurities" is intended to cover both impurities which may be found in the germanium material and impurities intentionally added. The terms "germanium material" and "germanium oxide material" are intended to designate materials that are essentially germanium or germanium oxide containing very small amounts of significant impurities.

It has been found that asymmetrical conductors and like devices such as the point contact rectifier or detector can be made with bodies of germanium of high purity except for very small amounts of impurities, which have a considerable effect upon the electrical properties of these germanium bodies. For example, as pointed out in applicants' application Serial No. 638,351, filed December 29, 1945, the addition or retention of very small amounts of impurities, such as arsenic, phosphorus or antimony, results in an N-type rectifying material capable of operation at relatively high reverse voltages. An N-type material in connection with a point contact passes current more easily when the material is negative and the point positive whereas the reverse is true of a P-type material. The thermoelectric and Hall effects of such materials are also consistent with the direction of rectification.

Since a very small amount of impurity can have a considerable effect upon the electrical characteristics of the finished germanium material, great care must be taken to avoid introduction of unwanted impurities during processing.

One method of preparing germanium material for rectifiers and the like starts with a germanium dioxide material which is reduced to germanium material of high purity. This material may be of such high purity as to require addition of desired impurities; may contain a sufficient amount of desired impurity; or may contain more of the desired impurity than is wanted for the production of said electrical characteristics. Undesired impurities may be introduced at this stage of the processing if specific precautions are not desired. For example, using the process set forth in the beforenoted application Serial No. 638,351, it is possible to obtain an ingot that is substantially all N-type germanium but which contains small zones of P-type germanium material. This indicates that an impurity responsible for P-type germanium is present to some extent. Subsequent heat treatment is then necessary to convert the P-type material to N-type material. Moreover, the amount of desired impurities may be high enough so that the last frozen part of the ingot may contain sufficient amounts of the desired impurity to impair the high back voltage characteristic.

One general object of this invention is to improve the preparation of germanium material for rectifiers and like devices so as to increase the yield of usable material.

A more specific object of this invention is to improve the method of preparation of germanium material so as to eliminate zones of P-type material and to increase the yield of high back voltage N-type material.

One feature of this invention resides in the use of a graphite crucible as the container during reduction of the germanium oxide material to germanium material.

Another feature involves removal of the last frozen, high impurity portion of the ingot and then remelting and freezing the remainder to redistribute the impurity.

A further feature resides in controlling the rate of cooling of the melt of germanium material so as to obtain a more favorable distribution of impurities.

Figure 2:
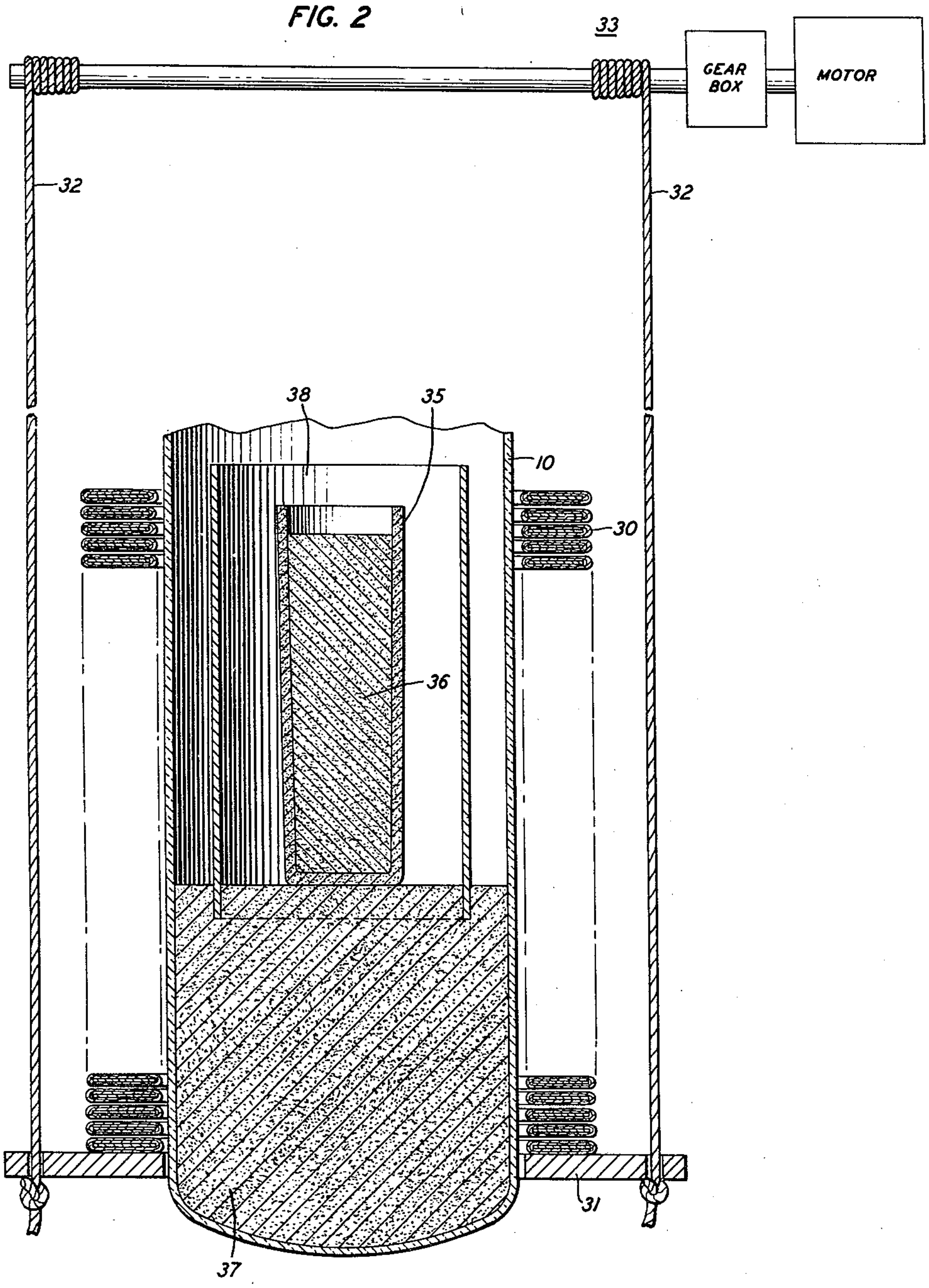

Other and further objects and features of this invention will be more fully and clearly understood from the following description of illustrative embodiments of the invention taken in connection with the appended drawings in which:

Fig. 1 is a sectional view of a furnace suitable for use in one stage of the process in accordance with one feature of the invention; and Fig. 2 is a sectional view of a portion of a furnace and auxiliary means employed in another stage of the process.

Ingots of germanium material may be prepared from germanium oxide material in a furnace such as the one illustrated in Fig. 1. The furnace, which is used in a horizontal position, comprises a tube 10 of silica or like material, provided with a watercooled head 11 and a heater 12. The head 11 is provided with cooling coil 13, a cover 14, and a gas inlet 15 and is joined vacuum tight to the tube 10 by packing 18. A shield tube 16 of silica or other suitable material is secured to the head 14 and contains a thermocouple 17. The head 14 is provided also with a gas outlet 20 and a viewing window 21.

The heater 12 may comprise a coil of resistance wire 22 wound on a suitable form 23 and having terminals 24.

The germanium oxide material 25 to be processed is contained in a dish or crucible 26 of graphite. Such a dish may be cylindrical and of the order of two inches high and slightly less than two inches in diameter.

An illustrative reduction of germanium oxide material may be carried out as follows: about 75 grams of the oxide 25 are placed in the graphite dish 26 which is placed in the tube 10, which is then sealed by means of the cover 14. After the furnace tube is flushed with pure dry hydrogen, the oxide is heated to 650° C. and held at this temperature for three hours while a flow of hydrogen of about 10 liters per minute is maintained. During the next forty-five minutes to one hour the temperature is raised to 1000° C. to complete the reduction with the germanium material in the liquid state and is held at this temperature for about fifteen minutes. The furnace is then allowed to cool to room temperature. Reduction by this process results in a body of germanium material of about 51 grams weight, which may be subsequently crushed into pieces of convenient size for the next step.

The next step may be carried out in an induction furnace, portions of which are illustrated in Fig. 2. This furnace is similar to the one illustrated in Fig. 1 but is employed in a vertical position and is provided with a movable induction heater.

As shown in Fig. 2, the furnace tube 10, the lower portion only of which is shown, is surrounded by the coil 30 of an induction heater. The coil 30 is provided with suitable means for raising or lowering it with respect to the furnace charge. For example, this may be a hoist comprising a platform 31, cable 32 and hoisting mechanism 33.

The graphite crucible 35 containing the charge 36 of germanium material may be slightly tapered to facilitate removal of the completed germanium material ingot. The crucible may be placed in the heating zone of the furnace on a bed of refractory material 37 and may be surrounded by a cylinder 38 of silica or other like suitable material. The cylinder 38 protects the furnace tube and reduces radiation losses. A convenient size of crucible is about one inch in diameter and about four inches long.

The furnace charge may comprise crushed germanium material which has been reduced as before described. The charged crucible is placed in the furnace which is sealed from the atmosphere and continuously flushed with helium at the rate of about one-half to one liter per minute. If the furnace is known by experience to be absolutely gas-tight the helium flow may be discontinued after all of the air has been flushed from the furnace tube. The charge is liquefied by raising the temperature of the crucible to about 1000° C. As a precautionary measure, the surface of the liquefied material may now be covered with degassed powdered graphite but this step does not appear to be essential. After holding the germanium material in the liquid state for about fifteen minutes the melt is slowly solidified from the bottom upward by raising the heater coil at a controlled rate with the power still applied to the coil. The induction coil may be raised at the rate of from one-eighth inch to one-twenty-fourth inch per minute keeping the power input through the coil at a constant value. After the ingot has reached about 650° C. the power is shut off and the ingot is allowed to cool to room temperature.

The ingot may be divided into bodies, usually called crystals, for use in circuit elements by suitable means. One way of doing this is to cut the ingot into slices about .025 inch thick, plate one side of each slice with a metallic film and then cut the slices into .052 inch squares. The cutting may be done with a diamond saw and the plating may be of copper, nickel, rhodium or other suitable metal applied electrolytically or by another suitable process.

It is essential that the cooling rate in the range 800 to 500° C. be slow enough to insure a yield of N-type rather than P-type germanium, since too rapid cooling in this range may result in an ingot all of P-type material. Where N-type material is desired it may be insured by heat treating the ingot at about 500° C. for twenty-four hours in a neutral atmosphere such as helium. It has been found, however, that by using the lowest rate of cooling in the above process, all N-type material is produced in most cases.

The very slow withdrawal of the heater in an axial direction allows time for a relatively even distribution of heat in the melt radially or in the direction perpendicular to the axial direction. Thus the freezing takes place substantially in a plane perpendicular to the axis, there being little or no progressive freezing in the radial direction.

Under some conditions and for some purposes it may be desirable to perform all of the heatings in the same furnace. This may be done in a furnace such as is shown in Fig. 2. The reduction of the oxide material to germanium material will be done without moving the heater coil and the power input will be maintained at a level required to give a temperature of 650° C. for reduction. The heat treatment at 500° C. if used, may be carried out in a similar manner.

If, notwithstanding the above process and precautions, the amount of desired significant impurity is so high that only a relatively small amount of high back voltage germanium material is obtained, further steps may be employed to insure a greater yield of relatively high back voltage material. Use is made of the fact that in solidifying an ingot from the bottom upward, the impurities are concentrated at the top, which freezes last. By removing the part of the ingot near the top and remelting the remainder the material in the second ingot will be of higher purity and thus have higher peak reverse voltages and back resistances. For example, in a 50-gram ingot, about 5 grams might be removed from the top before remelting.

As an example of the advantage of this latter treatment in improving the yield of high back voltage material, the yield of germanium material having a peak reverse voltage above 75 volts was raised from 32 to 69 per cent, basing the percentage on the quantity of germanium material initially used. In cases where the initial yield of high back voltage material above 75 volts was slightly greater than 80 per cent no over-all improvement of yield was realized by cropping and remelting but the over-all level of peak back voltage and back resistance was raised.

As examples of the improvement which may be obtained by cooling the ingot at a relatively slow rate the following are noted: An ingot of a given material cooled by removing the heater at the rate of one-eighth inch per minute yielded high back voltage material of 75 volts or better to the extent of 59 per cent. The same material when cooled at a rate of one-twenty-fourth inch per minute yielded 77 per cent material of a back voltage greater than 75 volts. In another case an 83 per cent yield at one-eighth inch per minute was improved to 92 per cent at one-twenty-fourth inch per minute.

Although specific embodiments of this invention have been shown and described, it will be understood that they are but illustrative and that various modifications may be made therein without departing from the spirit and scope of the invention.

What is claimed is:

1. A method of making circuit elements of germanium material that comprises heating germanium oxide material containing more impurity than is required in the finished product in a graphite container in the presence of a reducing atmosphere to obtain germanium material including the impurity, melting the resulting germanium material in a graphite container, cooling the melt to progressively solidify it from one extremity to the other, whereby the impurity is of greater concentration in the last frozen portion of the resulting ingot, removing some of this last frozen portion, remelting the remainder of the ingot and progressively cooling it to redistribute the impurity, and dividing the solidified material into circuit elements.

2. A method of preparing germanium material for use in conductive devices that comprises heating germanium oxide material in a graphite container in the presence of a reducing atmosphere to obtain germanium material, melting the resulting material in a graphite container, cooling the melt to progressively solidify it from one extremity to the other, and dividing the solidified material into circuit elements.

3. A method of preparing germanium material for circuit elements that comprises heating germanium oxide material in a graphite container in the presence of a reducing atmosphere to obtain germanium material, melting the resulting germanium material in a graphite container, cooling the melt to progressively solidify it from one extremity to the other by removing the heat source at the rate of about one-twenty-fourth inch per minute, and dividing the solidified material into circuit elements.

4. The method of preparing germanium material for use in conductive devices which comprises melting a quantity of germanium material, progressively cooling the melt along an axis, whereby the impurities present are of greater concentration in the last frozen portion of the resulting ingot, removing some of the last frozen portion, remelting the remainder of the ingot, and progressively cooling it to redistribute the impurities.

JACK H. SCAFF.
HENRY C. THEUERER.

REFERENCES CITED

The following references are of record in the file of this patent:

UNITED STATES PATENTS

| Number | Name | Date |
|---|---|---|
| 1,812,172 | Rohn | June 30, 1931 |

OTHER REFERENCES

Journal of the American Chemical Society, vol. 45, 1923, pages 2033–2047, article by Dennis et al.

Crystal Rectifiers by Torrey et al., 1st ed., 1948, published by McGraw-Hill Book Co., Inc., New York and London, pages 304–306 and 308–313.